United States Patent [19]

Mulrooney

[11] Patent Number: 5,703,289
[45] Date of Patent: Dec. 30, 1997

[54] MICROWAVE TRANSMITTER HOUSING

[75] Inventor: Michael J. Mulrooney, Downers Grove, Ill.

[73] Assignee: Magnetrol International, Inc., Downers Grove, Ill.

[21] Appl. No.: 382,389

[22] Filed: Feb. 1, 1995

[51] Int. Cl.[6] .................................................. G01S 13/00
[52] U.S. Cl. .................................... 73/290 V; 333/252
[58] Field of Search ............................ 73/290 V, 290 R; 342/124

[56] References Cited

U.S. PATENT DOCUMENTS

| | | |
|---|---|---|
| 3,818,333 | 6/1974 | Walker . |
| 4,371,854 | 2/1983 | Cohn et al. . |
| 4,566,321 | 1/1986 | Zacchio . |
| 4,641,139 | 2/1987 | Edwardsson ............... 342/124 |
| 4,670,754 | 6/1987 | Zacchio . |
| 5,051,715 | 9/1991 | Agosti et al. . |
| 5,115,218 | 5/1992 | Jean . |
| 5,136,299 | 8/1992 | Edwardsson ............... 73/290 V |
| 5,262,743 | 11/1993 | Jean . |
| 5,507,181 | 4/1996 | Fox et al. ................... 342/124 |

*Primary Examiner*—Ronald L. Biegel
*Attorney, Agent, or Firm*—Wood, Phillips, VanSanten, Clark & Mortimer

[57] ABSTRACT

An improved housing assembly is used for a microwave level sensing instrument for sensing level of a process fluid in a vessel. The process vessel includes a vessel flange defining an opening into a storage space in the vessel. The housing assembly includes a flange assembly including a housing flange having a distal gasket face sealingly mateable with the vessel flange in use. The housing flange is connected to a window housing for housing a window spaced from the gasket face and providing a process seal. An electronics housing is mounted to the window housing. The electronics housing supports a microwave antenna proximate the window for focusing energy through the window to the process fluid.

25 Claims, 4 Drawing Sheets

MICROWAVE TRANSMITTER HOUSING

FIELD OF THE INVENTION

The present invention relates to microwave level sensing instruments and, more particularly, to a housing assembly therefor.

BACKGROUND OF THE INVENTION

Level sensing instruments are used for sensing level of a process fluid in a process vessel. Many such instruments are of the intrusive type in which a sensing apparatus is exposed to the process fluid for sensing level. Others are of the non-intrusive type in which the instrument is not directly exposed to process fluid. One such type of non-intrusive instrument transmits a signal from above the process fluid. The signal is deflected off the process fluid and returned, with the time of flight being calculated to determine distance from the instrument to a top surface of the fluid.

A microwave level sensing instrument, in one known form, uses radar techniques as by transmitting a signal at microwave frequencies. Such an instrument includes an antenna which focuses energy to the process fluid.

In a typical application, a process vessel includes a vessel flange defining an opening into a storage space in the vessel. In high pressure or high temperature or corrosive or explosive environments, it is desirable to maintain the process sealed. Such a flange can be sealed simply by installing the particular level sensing instrument. However, when the instrument must be removed for servicing or replacement, the seal is broken. Advantageously, the installation would include a process seal which need not be interfered with in order to service or replace the level sensing instrument.

The present invention is directed to solving one or more of the problems discussed above in a novel and simple manner.

SUMMARY OF THE INVENTION

In accordance with the invention a microwave level sensing instrument includes a housing assembly having a process seal which can be installed separate and prior to installation of a housing containing the related electronic components.

Broadly, there is disclosed herein an improved housing assembly for a microwave level sensing instrument for sensing level of a process fluid in a vessel. The process vessel includes a vessel flange defining an opening into a storage space in the vessel. The housing assembly includes a flange assembly including a housing flange having a distal gasket face sealingly mateable with the vessel flange in use. The flange is connected to a window housing which accepts a gasketed window sub-assembly spaced from the flange gasket face. This arrangement seals the process from the electronics housing and from the atmosphere, and provides explosion-proof protection in hazardous locations. An electronics housing is also mounted to the window housing in the flange assembly above the window. The electronics housing supports a microwave antenna proximate the window for focusing energy through the window to the process fluid.

More particularly, the window housing comprises a generally cylindrical housing having a through bore with an axial outer end mounted to the housing flange and an axial inner end mounted to the electronics housing. A counterbore at the inner end defines a shoulder. The window is seated on the shoulder. An inner wall of the counterbore is threaded and a threaded retaining ring secures the window in the counterbore seated on the shoulder. Moreover, the electronics housing includes a generally cylindrical neck having a threadable outer wall threadably received in the counterbore.

In one aspect of the invention a gasket is disposed between the window and the shoulder.

According to another aspect of the invention an O-ring is disposed between the window and the shoulder.

In accordance with an alternative embodiment, the improved housing assembly comprises a flange assembly including a window housing having an inner end and an opposite outer end. A housing flange is mateable with the vessel flange, in use. The housing flange is connected to the window housing outer end. The transparent window is received in the window housing intermediate the opposite ends providing a process seal. Retaining means mountable to the window housing from the inner end retains the window in the window housing. An electronics housing is mounted to the window housing at the inner end. The electronics housing supports the microwave antenna proximate the window for focusing energy through the window to the process fluid.

According to yet a further embodiment, a microwave level instrument senses level of a process fluid in a process vessel. The process vessel includes a vessel flange defining an opening into a storage space in the vessel. An electronics housing supports a microwave antenna. A flange assembly includes a housing flange having a distal gasket face sealingly mateable with the vessel flange, in use, the housing flange being connected to a window housing. A window is housed in the window housing and spaced from the gasket face and providing a process seal. Means are provided for mounting the electronics housing to the window housing so that the antenna extends into the window housing proximate the window to focus microwave energy through the window to the process fluid.

Further features and advantages of the invention will be readily apparent from the specification and from the drawing.

DETAILED DESCRIPTION OF THE DRAWINGS

Figure 1:
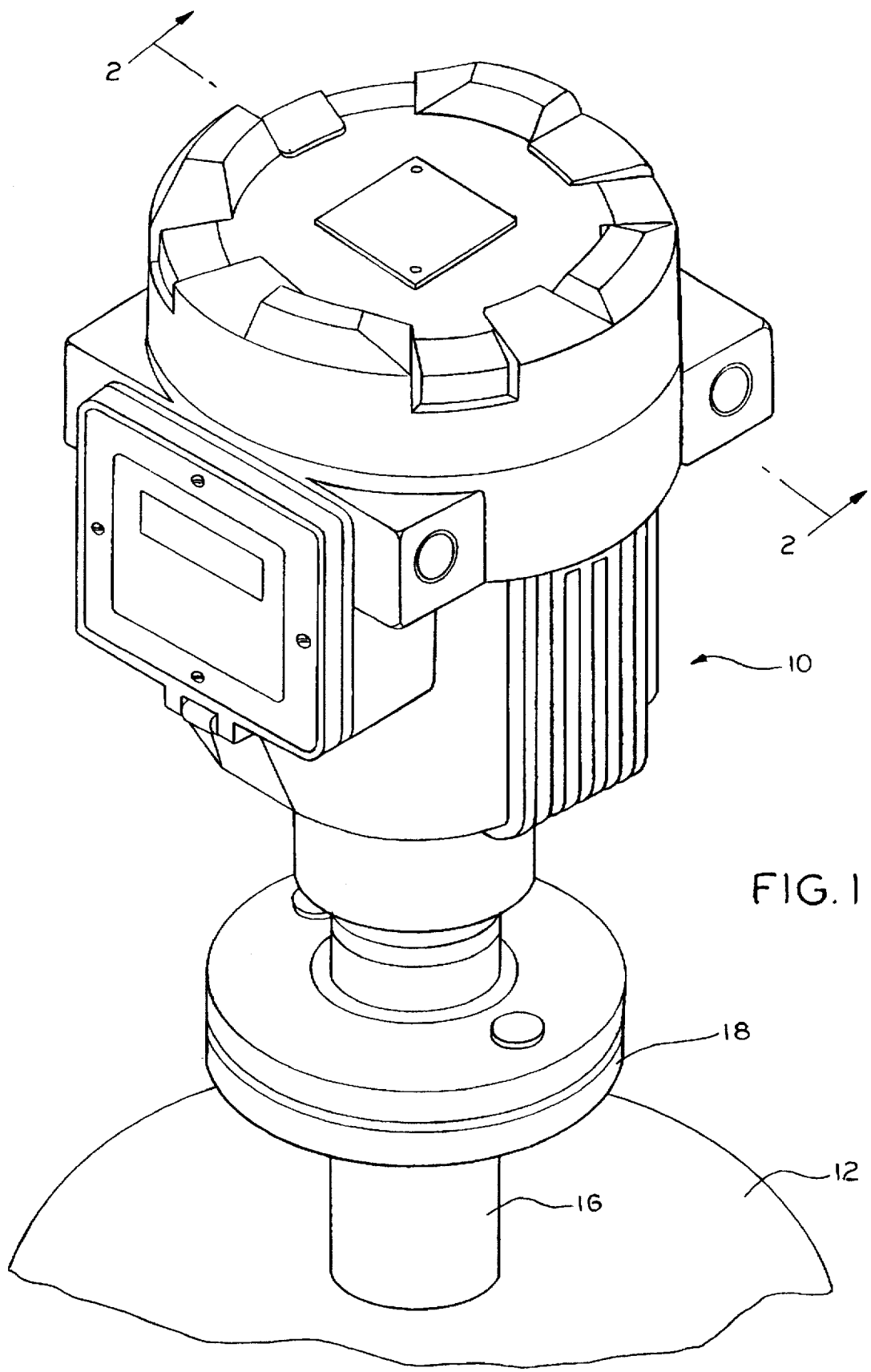
FIG. 1 is a perspective view of a microwave level sensing instrument including a housing according to the invention and mounted to a process vessel.
Figure 2:
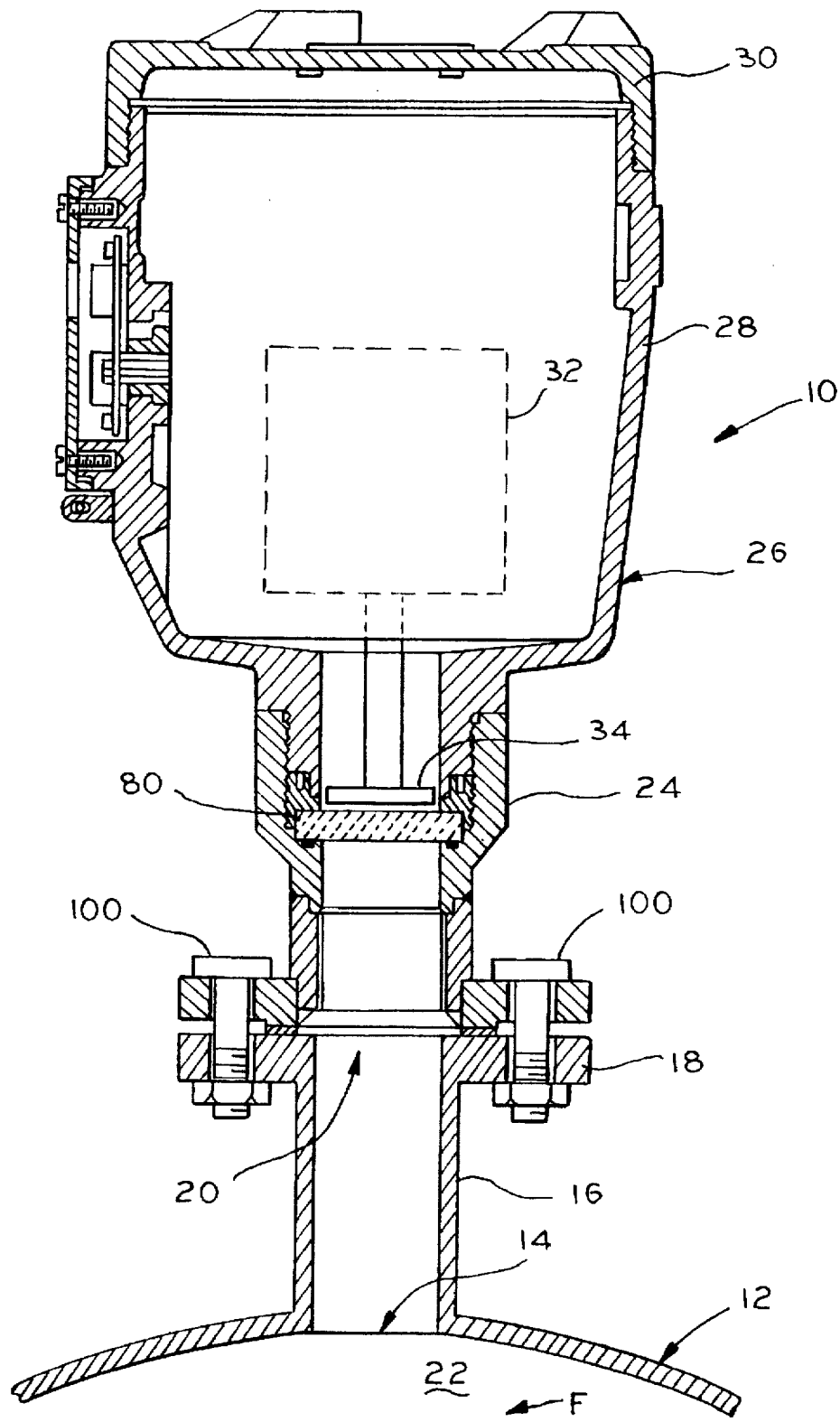
FIG. 2 is a sectional view taken along the line 2—2 of FIG. 1.

Referring to FIG. 1 and FIG. 2, a microwave level sensing instrument 10 is shown for sensing level of a process fluid F in a process vessel 12. The process vessel 12 includes a top opening 14 in communication with a cylindrical neck 16 connected to a vessel flange 18. The vessel flange 18 defines an opening 20 through the neck 16 and top opening 14 into a storage space 22 containing the process fluid F. The microwave level sensing instrument 10 is operable to determine distance of a top surface of the fluid F from the top opening 20 for the purpose of determining the absolute level of the fluid in the vessel, as discussed below.

The term fluid is used herein to refer to any type of media which can be stored in a process vessel and sensed in accordance with the teachings described herein.

The microwave level sensing instrument 10 includes a flange assembly 24 and an electronics housing 26. The electronics housing 26 includes a base 28 and a removable cover 30 enclosing suitable electronic circuitry represented by the block 32 in dashed line. The electronic circuitry 32 is associated with a planar antenna 34. The planar antenna is operated by the electronic circuitry 32 for focusing energy to the process fluid F. A returned signal is received and the time of flight is measured to determine distance from the antenna 34 to the top surface of the process fluid F, representing level in the vessel 12.

The present invention is not concerned with the particular antenna 34 or the electronic circuitry 32. Instead, the present invention is directed specifically to the housing assembly for containing these components and providing a process seal for the vessel 12 separate from the electronics housing 26.

Figure 3:
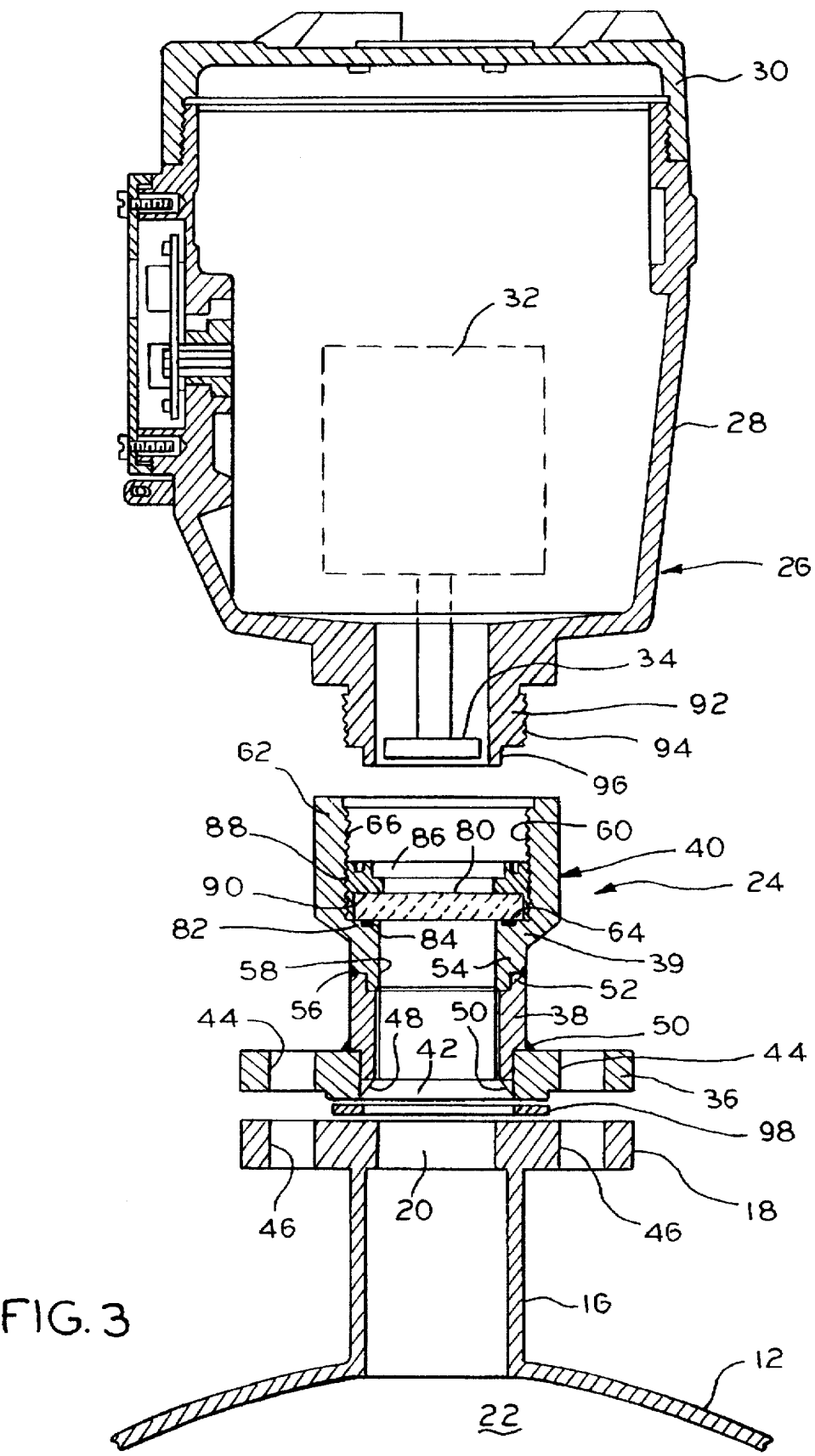
FIG. 3 is a sectional view similar to that of FIG. 2 showing various elements in exploded view.

Referring particularly to FIG. 3, the flange assembly 24 includes a housing flange 36 and a window housing 40. The window housing 40 includes a weld bushing 38 and an antenna housing 39. The housing flange 36 is of a size corresponding to the vessel flange 18 and including a central circular through opening 42. A plurality of peripheral through openings 44 are provided to be in alignment with similar through openings 46 in the vessel flange 18. The housing flange 36 includes a gasket face 46 which is sealingly mateable with the vessel flange 18, in use, as discussed below.

The weld bushing 38 comprises a generally cylindrical element having an outer end 48, also the outer end of the window housing 40, received in the flange through opening 42 and welded therein as at 50. An inner end 52 is similarly mated with an outer end 54 of the antenna housing 39 and secured thereto as by welding as at 56 to form the window housing 40. Alternatively, the window housing 40 could be of one piece construction made, for example, by casting.

The window housing 40 comprises a generally cylindrical housing having a through bore 58 in communication with the flange opening 42. The housing 40 includes a counterbore 60 at an axial inner end 62. The counterbore 60 defines a shoulder 64 intermediate the inner end 62 and outer end 54. An inner wall 66 of the counterbore 60 comprises a threaded inner wall.

In accordance with the invention, a window 80 of approximately ½ inch thickness is housed in the window housing 40. The window 80 is constructed of, for example, glass. Alternatively, a material such as Teflon or Halar could be used. An O-ring 82 is received in an annular groove 84 in the shoulder 64. The window 80 is centrally positioned on the shoulder 64. A retaining ring 86 has an outer wall 88 threaded to mate with the counterbore threaded inner wall 66. Thus, the retaining ring 86 is threadably received in the counterbore 60 so that the window 80 is sandwiched between the retaining ring 86 and the shoulder 64. A layer of Scotchcast 90 is applied between the retaining ring 86 and the window 80.

The electronics housing base 28 includes a neck 92 having a threaded outer wall 94. Particularly, the threaded outer wall 94 is specified to be threadably received in the counterbore threaded inner wall 66 of the flange assembly 24. The planar antenna 34 is secured in the electronics housing 26 so that it is proximate an outer end 96 of the neck 92.

In a typical installation, the flange assembly 24 is separated from the electronics housing 26, as shown in FIG. 3. An annular gasket 98 is positioned between the vessel flange 18 and housing flange 36. The flanges 18 and 36 are then secured together using fastening elements 100, see FIG. 2, in a conventional fashion. Owing to the inclusion of the window 80, the installation is thus provided with a process seal. The window 80 also acts as an explosion-proof barrier. As such, the process vessel 12 can be placed in service even prior to installation of the electronics housing 26. With this construction, the window 80 is provided spaced from the gasket face 46 so as to not interfere with the interface between the flanges 18 and 36 and the gasket 98. Moreover, because the window 80 is received in the counterbore 60 at the axial inner end 62, the window 80 can be removed and replaced, as necessary, by simply unthreading the retaining ring 86 without the requirement of removing the flange assembly 24 from the vessel 12.

The electronics housing 26 is mounted to the flange assembly 24 as by threading the neck 92 in the counterbore 60. Incident to such installation, the antenna 34 is proximate the window 80, as shown in FIG. 2, so that microwave energy from the antenna 34 is focused through the window 80 to the process fluid F. Subsequently, if servicing of the electronics housing 26 is required, then either the cover 30 can be removed from the base 28 or the entire electronics housing 26 can be threadably removed from the flange assembly 24 without breaking the process seal provided by the window 80.

Figure 4:
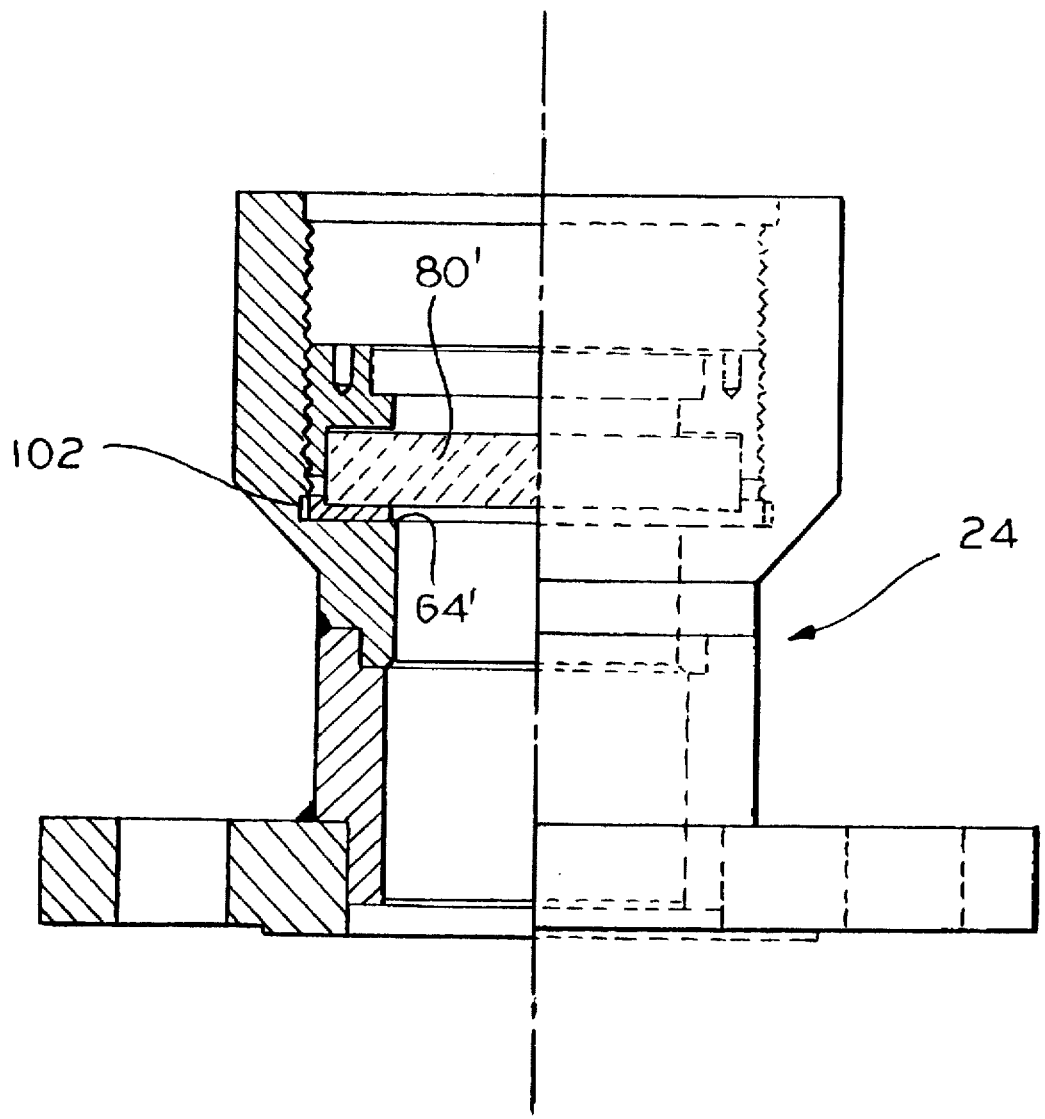
FIG. 4 is a partial sectional view of a flange assembly according to an alternative embodiment of the invention.

Referring to FIG. 4, a flange assembly 24' according to an alternative embodiment of the invention is illustrated. In this illustration, like elements are indicated with like primed reference numerals. Particularly, the principal difference between the flange assembly 24' of FIG. 4 and the flange assembly 24, discussed above, is that the O-ring 82 is eliminated and replaced with a gasket 102 between the window 80' and the shoulder 64'.

In both illustrated embodiments for the flange assembly 24 and 24', the window housing 40 is illustrated as a two piece component including the weld bushing 38 and the antenna housing 39. However, the two-piece construction could be replaced with a single element, as is apparent. As such, the window housing 40 can be considered herein to be integral with and include the weld bushing 38 as either a one-piece structure or two-piece structure, as shown. Likewise, the flange 36 could be an integral part of a one-piece flange assembly 24 in accordance with the teachings of the invention which are particularly directed to the use of the window 80 mounted in the window housing 40 spaced from the gasket face 46 and removable at the inner end 62.

Thus, the invention broadly comprehends the provision of a process seal in the form of a window spaced from a vessel gasket face and readily removable without necessity of removing the flange assembly 24 from the process vessel flange 18.

I claim:

1. In a microwave level sensing instrument for sensing level of a process fluid in a process vessel, the process vessel including a vessel flange defining an opening into a storage space in the vessel, an improved housing assembly comprising:

a flange assembly including a housing flange having a distal gasket face sealingly mateable with the vessel flange, in use, and connected to a window housing for housing a window spaced from the gasket face and providing a process seal; and an electronics housing mounted to said window housing, the electronics housing supporting a microwave antenna proximate the window for focusing energy through the window to the process fluid.

2. The improved housing assembly of claim 1 wherein said window housing comprises a generally cylindrical housing having a through bore with an axial outer end mounted to the housing flange and an axial inner end mounted to the electronics housing.

3. The improved housing assembly of claim 2 wherein said window housing includes a counterbore at the inner end defining a shoulder and wherein said window is seated on the shoulder.

4. The improved housing assembly of claim 3 wherein an inner wall of said counterbore is threaded and further comprising a threaded retaining ring securing said window in the counterbore seated on the shoulder.

5. The improved housing assembly of claim 4 wherein said electronics housing includes a generally cylindrical neck having a threaded outer wall threadably received in the counterbore.

6. The improved housing assembly of claim 3 further comprising a gasket disposed between said window and said shoulder.

7. The improved housing assembly of claim 3 further comprising an O-ring disposed between said window and said shoulder.

8. The improved housing assembly of claim 2 wherein said window housing comprises a two-piece housing and said two pieces are secured together as by welding.

9. The improved housing assembly of claim 1 wherein said electronics housing is removably mounted to the window housing.

10. In a microwave level sensing instrument for sensing level of a process fluid in a process vessel, the process vessel including a vessel flange defining an opening into a storage space in the vessel, an improved housing assembly comprising:

a flange assembly including a window housing having an inner end and an opposite outer end, a housing flange mateable with the vessel flange, in use, and connected to the window housing outer end, a window received in the window housing intermediate the opposite ends providing a process seal, and retaining means mountable to the window housing from the inner end for retaining the window in said window housing; and an electronics housing mounted to said window housing at the inner end, the electronics housing supporting a microwave antenna proximate the window for focusing energy through the window to the process fluid.

11. The improved housing assembly of claim 10 wherein said window housing comprises a generally cylindrical housing having a through bore.

12. The improved housing assembly of claim 11 wherein said window housing includes a counter bore at the inner end defining a shoulder and wherein said window is seated on the shoulder.

13. The improved housing assembly of claim 12 wherein an inner wall of said counterbore is threaded and the retaining means comprises a threaded retaining ring securing said window in the counterbore seated on the shoulder.

14. The improved housing assembly of claim 13 wherein said electronics housing includes a generally cylindrical neck having a threaded outer wall threadably received in the counterbore.

15. The improved housing assembly of claim 12 further comprising a gasket disposed between said window and said shoulder.

16. The improved housing assembly of claim 12 further comprising an O-ring disposed between said window and said shoulder.

17. The improved housing assembly of claim 10 wherein said window housing comprises a two-pie housing and said two pieces are secured together as by welding.

18. The improved housing assembly of claim 10 wherein said electronics housing is removably mounted to the window housing.

19. A microwave level sensing instrument for sensing level of a process fluid in a process vessel, the process vessel including a vessel flange defining an opening into a storage space in the vessel comprising:

an electronics housing supporting a microwave antenna;

a flange assembly including a housing flange having a distal gasket face sealingly mateable with the vessel flange, in use, the housing flange being connected to a window housing;

a window housed in the window housing and spaced from the gasket face and providing a process seal; and means for mounting the electronics housing to the window housing so that the antenna extends into the window housing proximate the window to focus microwave energy through the window to the process fluid.

20. The microwave level sensing instrument of claim 19 wherein said window housing comprises a generally cylindrical housing having a through bore with an axial outer end mounted to the housing flange and an axial inner end mounted to the electronics housing.

21. The microwave level sensing instrument of claim 20 wherein said window housing includes a counterbore at the inner end defining a shoulder and wherein said window is seated on the shoulder.

22. The microwave level sensing instrument of claim 21 wherein an inner wall of said counterbore is threaded and further comprising a threaded retaining ring securing said window in the counterbore seated on the shoulder.

23. The microwave level sensing instrument of claim 22 wherein said electronics housing includes a generally cylindrical neck having a threaded outer wall threadably received in the counterbore.

24. The microwave level sensing instrument of claim 22 further comprising a gasket disposed between said window and said shoulder.

25. The microwave level sensing instrument of claim 22 further comprising an O-ring disposed between said window and said shoulder.

* * * * *